United States Patent [19]

Meteer et al.

[11] Patent Number: 5,773,121
[45] Date of Patent: Jun. 30, 1998

[54] SYNTACTIC FOAM CORE INCORPORATING HONEYCOMB STRUCTURE FOR COMPOSITES

[75] Inventors: Charles L. Meteer; Thomas E. Philipps, both of Granville, Ohio

[73] Assignee: Isorca Inc., Granville, Ohio

[21] Appl. No.: 769,792

[22] Filed: Dec. 19, 1996

Related U.S. Application Data

[63] Continuation-in-part of Ser. No. 600,850, Feb. 13, 1996, which is a continuation-in-part of Ser. No. 282,371, Jul. 29, 1994, Pat. No. 5,587,231.

[51] Int. Cl.$^6$ .............................. B32B 3/12; B32B 3/26; B32B 5/16; B32B 18/00
[52] U.S. Cl. ........................ 428/117; 156/145; 156/146; 156/197; 156/276; 156/320; 181/292; 264/45.3; 264/46.5; 264/46.6; 264/630; 428/118; 428/313.5; 428/313.9; 428/317.9; 428/406; 493/966
[58] Field of Search .................................... 428/117, 118, 428/313.5, 313.9, 317.9, 406; 156/145, 146, 197, 276, 320; 264/45.3, 46.5, 46.6, 630; 181/292; 493/966

[56] References Cited

U.S. PATENT DOCUMENTS

| | | | |
|---|---|---|---|
| 2,806,509 | 9/1957 | Bozzacco et al. | 442/238 |
| 3,855,160 | 12/1974 | Shiotsu et al. | 428/305.5 |
| 4,025,686 | 5/1977 | Zion | 428/310.5 |
| 4,132,755 | 1/1979 | Johnson | 264/553 |
| 4,144,372 | 3/1979 | Beck | 428/325 |
| 4,178,406 | 12/1979 | Russell | 428/406 |
| 4,193,829 | 3/1980 | Kourtides et al. | 156/276 |
| 4,201,823 | 5/1980 | Russell | 264/101 |
| 4,861,649 | 8/1989 | Browne | 428/313.3 |
| 4,917,945 | 4/1990 | Cattanach | 428/313.3 |
| 5,030,488 | 7/1991 | Sobolev | 428/35.9 |
| 5,034,256 | 7/1991 | Santiso et al. | 428/73 |
| 5,219,629 | 6/1993 | Sobolev | 428/35.9 |
| 5,587,231 | 12/1996 | Meteer et al. | 442/375 |

*Primary Examiner*—Marion E. McCamish
*Assistant Examiner*—Blaine R. Copenheaver
*Attorney, Agent, or Firm*—Charles F. Schroeder

[57] ABSTRACT

A syntactic structural foam product in flat sheet form or curved three-dimensional form adaptable to such uses as a light weight structural core for composite laminates, is made of a mixture of hollow ceramic microspheres and dry resin powder, of either thermosetting or a high-temperature thermoplastic resin, distributed in the interstices of the mass of microspheres for integration of the mixture into desired form upon heating and cooling. The dry resin powder in another embodiment of the invention includes unexpanded expandable powder which will expand into microballoons in the confined spaces in which they reside and effect a bonding relation with surrounding particles upon supply of heat to the mixture. The foam product is produced by thoroughly intermixing and depositing the mixture as a layer over a surface having a release agent thereover within a dimension defined region. Heat is then supplied, with or without pressure, to the layer at a temperature and for a time period sufficient to effect a melting or softening of the resin powder. Thereafter the resin is cooled to a hardened condition to integrate the mixture into the product desired after which the product is withdrawn from the forming zone. The mixture in layer form can be reinforced with honeycomb structures and/or with elements such as glass or carbon fibers selectively included in the mixture for predeterminable physical properties.

20 Claims, 4 Drawing Sheets

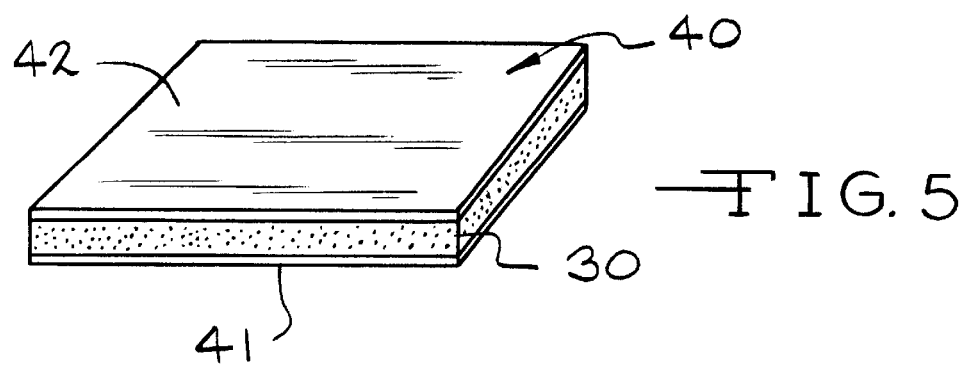
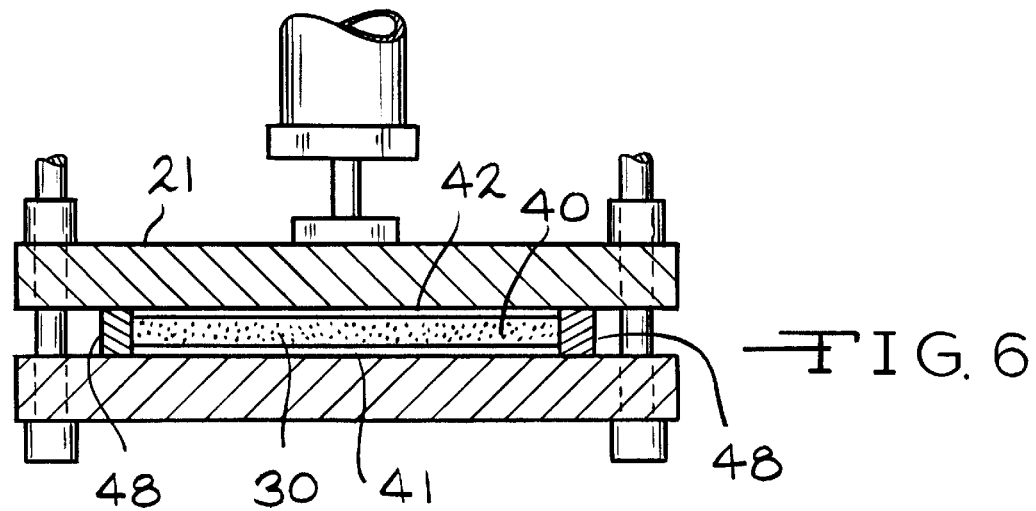

SYNTACTIC FOAM CORE INCORPORATING HONEYCOMB STRUCTURE FOR COMPOSITES

RELATED APPLICATIONS

This application is a continuation in part of application U.S. Ser. No. 08/600,850 filed Feb. 13, 1996 now allowed, which in turn is a continuation in part of application U.S. Ser. No. 08/282,371 filed Jul. 29, 1994 issued as U.S. Pat. No. 5,587,231 on Dec. 24, 1996.

FIELD OF THE INVENTION

The invention is related to a syntactic foam product made of a mixture of hollow ceramic microspheres, and dry resin powder intermixed therewith, such resin being either a thermosetting resin or a thermoplastic resin, particularly a high temperature thermoplastic resin. The hollow microspheres such as of glass and the resin are joined together by heating the mixture to integrate the combination as a flat sheet stock, or curved or complex shape, useable for example as a core for composite laminates, having preselectable strength, density and weight properties engineered therein.

The mixture of hollow ceramic microspheres can include with the dry resin powder, dry expandable resin powder particles which upon heating will expand into hollow microballoons or bubbles of resinous material which further effect a reduction of density and weight of the material and enable selection of other desirable engineerable physical properties in the core material.

BACKGROUND

Syntactic foam layers and products have been conventionally made by intermixing glass microspheres with a heated liquid binding resin, and at times including reinforcing elements such as fibers. The use of resin in a fluid state heated to effect a cure, however, results in a considerable release of fumes and liquid vapors which can interrupt or destroy the integrity of the material and often must be treated as environmentally objectionable. In contrast heat curing or setting of heated powdered resin in a mixture with microspheres results in little effluent of fumes or liquid vapor. In other words, phenolic resins, for example, during heating to a liquid phase and curing give off vapors in a considerable amount whereas dry phenolic powders during heat curing give off little vapor. In addition, resin in a fluid condition is less adaptable to providing a syntactic foam microsphere mixture capable of the wide range of light densities, weights and strength properties possible by use of resin powder according to the present invention.

A number of product properties can be imparted to a product by use of a reactive resin in powdered form that cannot be accomplished with resin in a liquid form. For example, the bulk density of powdered resin is much less than the bulk density of solid resin of the same composition or liquid formed of the resin by heating it to a melted condition. An important advantage of using powdered resin mixed with ceramic microspheres to form a syntactic foam layer according to the present invention is that the bulk density of the final product can be the same as that of the initial compacted mixture. During heating of the mixture, the powdered resin is converted to melted droplets which can flow over and join the microspheres of the mixture and may be aided by an adhesion promoting coating, for example a coupling agent, on the microspheres. The mixture is thus in a sense coalesced into a mass which upon hardening provides a light weight solid foam layer. The foam layer includes closed voids containing evolved gas and air. The bulk density of syntactic foam material as in the present invention can be half that of a conventional material made from liquid resin with intermixed microspheres. Additionally, the present invention eliminates the problems of high viscosity when many microspheres are added to a liquid resin, and eliminates the process problem of getting microspheres (which tend to float) wetted out and incorporated into a liquid resin.

It has been found that finer powder resins function much more effectively to produce the desired results than coarse powders. When the powders included are too coarse, the melting and dispersion of the material between the microspheres become more difficult and are much less effective in providing a uniformly integrated syntactic foam product.

The mixture can be heated by a number of techniques including induction heating with high frequency energy or conductive heating such as with heated platens on opposite major surfaces of the layer of microspheres and resin powder. During heating of a platen in contact with a layer of intermixed powdered resin and microspheres, a skin layer can be formed at the surfaces of the foam. To prevent the mixture from sticking to such platens a layer of separator material, a material which will not bond or unite with the syntactic foam layer, is provided between each of the platen surfaces and the surfaces of the microsphere mixture.

When it is desired that the density of the product be greater than that attained with the pressureless application of heat, the mixture can be compacted by bringing the heating platens closer together to establish a predetermined thickness. The thickness can be established by placing spacer members of the predetermined desired thickness between the platens which will limit the closeness to which the platens can be moved and thereby establish the desired thickness of the product produced. The spacers can also function to limit the area over which the microsphere-resin powder mixture can spread. In other words, they can be used to confine the area of the mixture, such as in a tray, to establish the predetermined dimensions of the product to be produced.

As described herein the invention is used to form a stratum or core for structural laminate panels, but variations of the mixture of glass microspheres and resin powder can be engineered for a wide range of products as well, such as flooring, ducts, and three dimensional products useable for aircraft, trucks, automobiles, ships, boats, industrial tanks and the like. The desired light weight and strength properties of the foam are attained in part by utilizing microspheres or bubbles, preferably hollow ceramic microspheres such as of glass commercially available in various diameters and wall thicknesses. The microsphere diameters and wall thicknesses are selected to impart specific predeterminable shear and compression strengths as well as desired weights and densities when integrated with the resin intermixed therewith. The powdered resin intermixed with the microspheres or bubbles is of substantially finer dimension than the bubbles thereby enabling thorough distribution of the powder and filling of the interstices between the bubbles.

The term "cured" or "curing" as applied to thermosetting resin herein refers to heat processing to a fluid then to a more stable hardened or set condition, but to facilitate description of the invention also refers herein to hardening of thermoplastic resins to a set condition upon cooling after being heated to a fluid condition according to the concepts of the present invention.

The bubbles of the mass may be of different sizes which permits their close compaction into an intimate mass for strength, while the finer resin powder fills the interstices more readily to effect an inter-bonding of the bubbles and resin. The amount of resin incorporated in the core can be just sufficient to effect the desired inter-bonded relation between components of the mixture, which with a light concentration of the powder in the mixture can result in the cured syntactic layer being porous and permeable. More desirably, however, for most applications the concentration of powder in the mixture is such that the cured integrated mass is substantially impermeable to moisture beside having high shear and compression strengths.

In another embodiment of the invention the resin powder in tie mixture can include dry expandable resin powders which will expand into resin microballoons upon supply of heat. A core material formed with such resin microballoons included therein can be additionally strengthened by the interbonding effects of the resin microballoons with the ceramic microspheres in addition to the bonds produced by the expanded resin particles.

The foam mixture can additionally include reinforcing elements such as glass or carbon fibers or fibers of other high strength material. In this regard the fibers may be incorporated in the mixture as individual fibers, as bundles of chopped strands, or as continuous filaments in nonwoven mats or woven fabrics. Other reinforcing elements such as honeycomb structures can also be incorporated in the core material as well.

Honeycomb structures having hexagon, circular, square or triangular cell configurations lend themselves to combination with the described syntactic foam material. Such honeycomb structures can be made of any of a number of base or sheet materials such as resin Impregnated sheets of paper, fabrics, woven or nonwoven, of glass fibers, carbon fibers, cellulose, and aramid fibers, etc. treated with resins such as phenolic, epoxy, nylon, etc., or metal sheet material such as aluminum and copper, or any of a number of other commercial materials in commercially available honeycomb structures. By incorporating the honeycomb structure in a syntactic foam core described, both the compressive strength and the shear strength of the layer of core material is increased considerably for uses such as in trailer floors and boat structures.

An object of the invention is to provide a mixture of components for formation of a syntactic foam material capable of being engineered and manufactured economically into products having a wide range of predeterminable structural properties.

Another more specific object of the invention is to provide a basic, easily processed, economically producible, light weight core material capable of providing structural properties in layer form adaptable to use in sandwich structure composites.

A feature of the invention is that the combination of powdered phenolic material and glass microspheres gives off little or no volatiles or fumes during cure.

An additional feature of the invention is that the inclusion of resin powder expandable into resin microspheres can effect a stronger over-all interbonding of the ceramic microspheres and provide a still lower density syntactic core material.

Another important feature is that the mixture can, within a wide range, be pre-engineered for a desired density, shear strength, compression strength, low flammability and low smoke and high moisture resistance while at the same time being capable of production at a low cost.

Still another feature is that reinforcing elements can be incorporated in the core material to further strengthen the core material such as by combining a honeycomb structure therewith and/or including reinforcing fibers such as in chopped roving form.

A further feature is that a syntactic foam core layer for laminar structures can be produced with no reduction in thickness dimension of the layer during heat processing.

Strength and density of the sheet can be modified by appropriate selection of the size and wall thickness of commercially available microspheres and the size and type of powder resin particles. The microspheres can be provided with a coating of a coupling agent such as silane to facilitate their coverage and inter-bonding by the melted resin powder. As pointed out the resin powders are of finer size than the small microspheres and fit in the interstices of the mass of microspheres to effect an inter-bonding upon heating and hardening. As the amount of resin present increases as part of the mixture the greater the weight of the microsphere foam product becomes.

The process of producing the syntactic sheet or core material involves first combining the microspheres and powdered resin. The combination is deposited as a layer on a base having a release agent or commercial release film over its surface to prevent bonding to the final foam product. The base also is provided with boundary means to define the dimensions of the product. The combination may be first vibrated for thorough intermixture of the resin powder in the microsphere interstices, and the mixture is then heated to melt the resin particles for inter-bonding with the microspheres. Although pressure is not necessary to effect the inter-bonding of microspheres and resin, pressure can be applied to the mixture as an assist in effecting its compaction when a more dense product is desired. Such compaction of the mixture can be effected by bringing the overlying and underlying heated platens to a preselected spacing for a desired thickness of the layer. The thickness of a given deposited layer as well as its density and mechanical properties of the final product can thus be predetermined.

As indicated, in addition to a mixture of microspheres and resin powder alone providing the base mixture for the product, structural reinforcement elements such as fibers (hollow or solid) or fiber bundles can also be selectively included. Other reinforcements for example can be mats of random reinforcing fibers or reinforcing fiber fabrics, both woven and non-woven, rods, glass flakes and honeycomb structures which in appropriate locations can improve mechanical properties such as shear strength and shear modulus of the sheet product.

In forming a core layer combining a honeycomb structure with syntactic foam, the syntactic foam material in uncured state can be deposited as a layer in the cavity of a two part cavity mold and the honeycomb structure placed thereover, whereupon the mold can be closed to join the two during cure of the syntactic foam. In this method, the honeycomb structure is pressed into the syntactic foam material as it is heated to soften the resin powder of The syntactic foam mixture which results in the syntactic foam extending partially or preferably fully into the cellular structure of the honeycomb layer. The combination can be formed with sufficient syntactic foam to cover both major surfaces of the honeycomb layer to fully enclose the honeycomb structure. In so forming the syntactic foam layer, the honeycomb cells, in a sense, form columns of syntactic foam extending between the major surface layers of syntactic foam of the overall layer. In other words, a sandwich structure of syntactic foam material thus provided reinforced by a honeycomb structure.

Alternately the combination can be formed by placing the honeycomb structure in the mold and pouring the dry constituent particles of the syntactic foam into place thereover to fill the cells and then closing the mold. If desired, a sufficient amount of constituent particles can be provided in the mold so that either one or both major surfaces are enclosed and the honeycomb structure is thus enclosed as a reinforcement within the body of syntactic foal core material.

Resin in powder form such as can be formed by grinding down solid resin, is selected for its fineness to fill the interstices of the microspheres which can be accomplished more readily than with coarser powders. To provide the binding relation for integration of the mixture, the powders are also selected for their chemical reactivity and heat softenable adhesive affinity for the glass microspheres. They can also be selected for low flame and smoke properties. In this regard, the invention is quite versatile in permitting trial and error establishment of the engineered properties desired.

The resulting syntactic foam product is corrosion resistant, electrically and thermally relatively non-conductive, non-magnetic, electromagnetically transparent, light weight, much less than the weight of steel, has high strength and dimensional stability, and is adaptable to providing a wide range of physical and mechanical properties.

Any of a number of reactive resin powders may be used to provide the specific desired properties including, but not limited to, phenolic resins aforementioned as well as epoxy and epoxy-modified phenolic resin, polyester resin powders, polyurethane, and polyphenylene sulphide. In addition powder resin from waste dust collection devices, such as in a resin manufacturing plant, can be used in the present invention. Disposal of these waste materials is particularly an environmental problem because they are most frequently reactive powders. The present invention is thus additionally advantageous in that it can frequently eliminate environmental problems by providing a value-added use for waste materials.

BRIEF DESCRIPTION OF THE DRAWINGS

FIG. 5 is a schematic perspective view of a laminate product having top and bottom surface layers shown with an in-between core layer of syntactic foam material of the present invention;

FIG. 6 is a schematic illustration of a laminate including a core material of the present invention faced with opposite surface layers in a press in which the assembly can be heat cured and selectively pressurized to an integrated condition;

DETAILED DESCRIPTION

Figure 1:
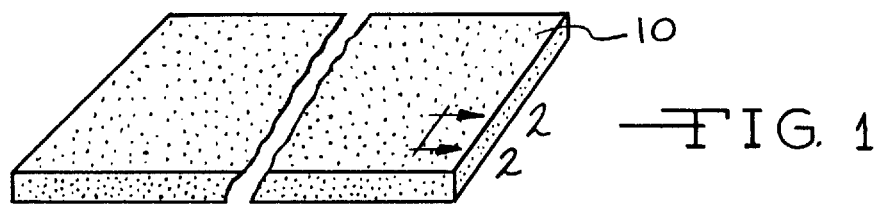
FIG. 1 is a broken away perspective view of a rigid syntactic foam core sheet product made according to the concepts of the present invention.

The beginning material of this invention is a particle mixture of hollow ceramic microspheres, preferably of glass, which are frequently referred to conventionally as bubbles, and resin powder of diameter finer than the microspheres which is heat softenable and curable or hardenable to effect inter-bonding of the mass into an integrated form. The beginning mixture may also include reinforcing elements such as chopped strands forming dispersed bundles of reinforcing fibers such as of glass or carbon. By way of example the powdered resin can be a thermosetting resin powder such as phenolic powders or powders of a thermoplastic resin such as polyphenylene sulfide reaction powder so that upon the mixture being heated, the mass of resin powders will soften and flow to effect the desired inter-bonding of the particles of the mass.

A coating of an adhesion promoting material can be provided on the microspheres, such as a silane coating, to facilitate wet out of the microspheres which results in better adhesion. Alternately an adhesion enhancing material and the resin powder or a catalyst might be included in a thermosetting powdered resin. For example, when the resin is a phenolic resin a catalyst such as hexamethylenetetramine can be included which can be cured in an oven at a temperature in the order of 350 degrees F.

The resin powder can be present in the mass of microspheres in an amount just adequate to effect the desired inter-bonding but at the high end of the volume spectrum can be present in an amount more than that which is adequate to fill interstices in the microsphere mass to form a solid integrated material of the mass. A range of densities of the microsphere mixture can thus be provided dependent upon the amount of resin incorporated therein.

An important aspect to understanding the principles of the present invention is that when hollow microspheres of given uniform size are perfectly packed, resulting in a minimum of void space between microspheres, it has been determined that the theoretically minimum amount of void space is about 26% of the total volume. Another important aspect is that powdered resin will diminish in volume when heated to a melted condition. The bulk volume of the melted resin will diminish in practice to about 35–50% of the bulk volume of the powder. Accordingly when microspheres are closely packed with the voids therebetween being filled with fine resin powder, heating of the mixture to melt the resin powder results in the resin diminishing in volume to its liquid state and leaving voids containing air and some gas vapors given off from the resin during melting. The amount of void space is generally about half the volume of resin powder originally added to the mixture.

The melted resin flows over the surface of the microspheres into their points of close proximity so that upon solidification the microspheres are solidly fused together leaving a generally predeterminable amount of void space in-between. Thus a syntactic foam product of predeterminable density can be produced. In this regard, if the volume of resin powder is less than or just fills the interstices of the layer of microspheres, the density of the mass can be maintained fixed throughout the heat processing to the final product.

If the amount of powdered resin added to the hollow microsphere mass fills the entire void space between the microspheres in its dry unheated state, after melting of the powder voids between microspheres will still result because of the lower bulk density of the powder resin. By way of example, if the amount of resin powder by bulk volume is about 26%, upon contraction to a melted state, in a perfectly packed mass, an internal void space of about 13 to 17% in the final product results.

If on the other hand the amount of powdered resin originally added to the mixture is less than about 26% for a theoretically perfectly packed mass of microspheres, such amount being just adequate to effect coverage and joinder of the microspheres, the void space remaining would be greater than 17% and result in a still lighter density syntactic foam.

Inter-bonding of particles can be effected by mere deposition of the mixture lightly packed as a layer without application of pressure and mere supply of curing heat thereto such as by contact of a hot platen surface to one side thereof. It has been found desirable, however, to selectively apply pressure for compaction of the mass mixture to provide a desired density and thickness in the final product. It will be understood that although the product as herein described is a planar core material for sandwich structure laminates, the concept of the invention lends itself to forming layers of different thicknesses in different regions as well as to form products of three dimensional shares such as by deposition on a curved surface or in an intricately shaped mold type heating unit with or without the presence of surface layers of a laminate product.

FIG. 1 shows a rigid heat cured syntactic foam sheet 10 formed of microspheres and resin to which surface skins or surface panel layers can be supplied to form a structural laminate. The thickness of the layer can be selected to provide the desired physical and mechanical properties of the finished composite laminate sandwich structure.

Figure 2A:
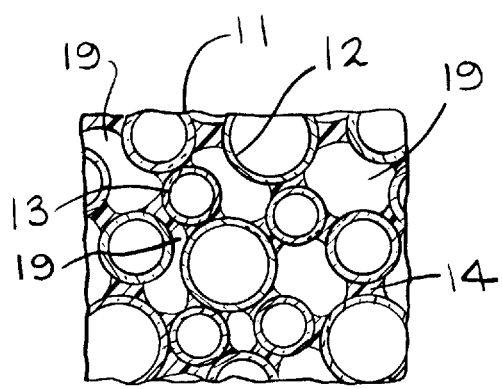
FIG. 2A is an illustration representative of a magnified broken away view of a portion of the product of FIG. 1 as taken on line 2—2 illustrating a mixture of hollow microspheres of different sizes and cured resin powder intermixed therewith.

FIG. 2A shows a portion of the body 10 of the syntactic foam material of FIG. 1 as taken on line 2—2 after being heated and set illustrating in detail the base particles of the integrated product wherein hollow microspheres 11, 12 and 13 of three different sizes with resin 14, originally in powdered condition, intermixed therewith as they appear in the cured body or sheet with voids 19 distributed therethrough. The resin powder used in forming the sheet product is of much finer size than the microspheres and is thoroughly intermixed therewith and is present in an amount adequate to effect the desired inter-bonding of the microspheres but, in some products of the invention, the resin powder is present in an amount selected to establish a predetermined bulk density as well as the desired shear and compression strengths of the sheet product which results in and at the same time leaves open voids 19 within the body.

Figure 2B:
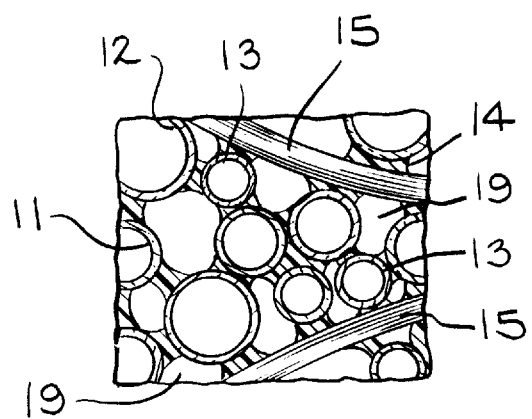
FIG. 2B is an illustration representative of a magnified broken away view of a product like that of FIG. 2A including bundles of reinforcing fibers.

FIG. 2B illustrates a syntactic foam material like that of FIG. 2A with glass fiber bundles 15 distributed therethrough to impart a greater shear strength to the core sheet to permit formation of higher strength laminate structures.

Figure 3:
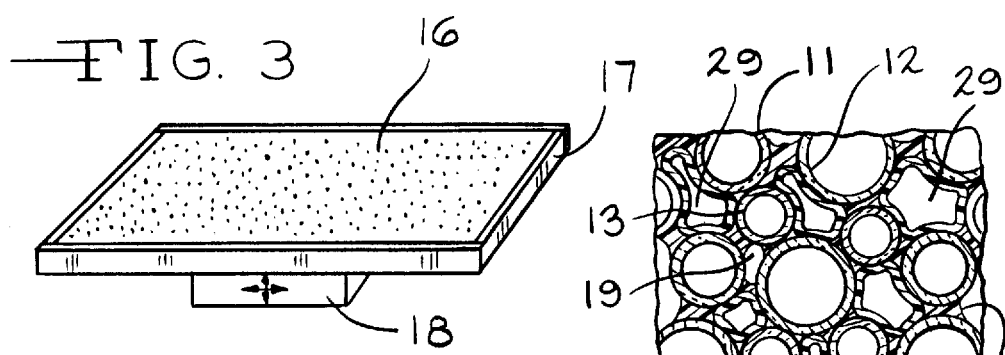
FIG. 3 is a representation of a layer of the mixture of the invention in a vibrating tray.

FIG. 3 is representative of a mixture 16 of microspheres and resin powder in a tray 17 mounted on a vibrator 18 typically at about 600 vibrations per minute for about 10–15 seconds to thoroughly intermix the components of the mixture prior to being heated. The tray 17 is made to provide the desired peripheral dimensions of the syntactic layer and thickness of boundary members for insertion in a heating unit. The tray 17 is provided with a layer of separator material at its bottom to avoid bonding of the mixture thereto and permit removal of the core material after heating to a resin melt stage and hardening. An overlayer of separator material is also provided over the top surface prior to insertion in a press type heating unit.

Figure 4:
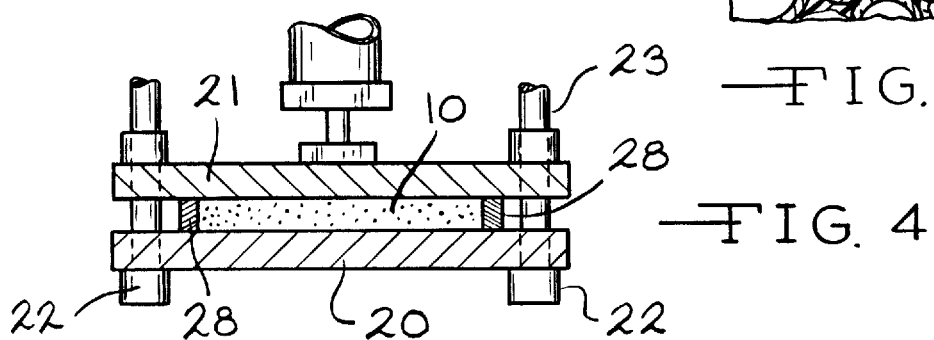
FIG. 4 is a schematic illustration of a layer of syntactic core material of the present invention in a press for heat cure and selective pressurization of the material of the present invention to an integrated condition.

FIG. 4 illustrates a heating press on pedestals 22 in which the syntactic foam core sheet 10 of FIG. 1 can be produced having a base platen 20 and a moveable upper platen 21 both of which can be heated with the mixture of microspheres and resin located within a confined space determined by boundary members 28 of predetermined thickness and location in the press which determine the thickness to which the upper platen 21 can press the uncured mass as well as the boundary dimensions of the sheet 10 which finally results. The upper platen 21 can be lowered on guide rods 23 to a level of the thickness of the boundary members 28 and the mass of microspheres and resin particles can be deposited within the confines of the boundary members 28 to provide the degree of compaction which will result in the desired density of the final core sheet 10 determined by trial and error in forming the foam material.

FIG. 5 shows a laminate 40 incorporating a syntactic core 30 of the invention having panels or sheets 41 at its base and 42 over its upper surface. The lower and upper surfaces 41 and 42 respectively can be resin panels or metal sheets bonded to the core 30 as a sandwich structure designed to have the strength properties as determined by calculation and trial and error construction of the structure. The lower and upper panels 41 and 42 respectively can be bonded together with the core 30 of the type described in relation to FIG. 1 by separate bonding of the faces to the core 30 after the core 30 has been cured as in a press illustrated in FIG. 6. The surface sheets, however, can also be bonded to the core in a press as shown in FIG. 6 wherein the lower panel 41 and upper panel 42 are placed in the press over the core material 40 as it is being heated to a cured condition. Boundary members 48 on opposite sides of the composite determine the thickness to which the upper platen 21 can press the combination. If one or both of the surface sheets are of pre-impregnated skin in an uncured condition, they can be combined with the syntactic foam core 40 while it is in an uncured state and the combination can then be cured in one cycle to effect a cure of both the skin layers as the core layer is being cured.

As a further variation of the invention the two skin layers 41 and 42 can be subjected to a partial cure, such as by being brought to a B-stage cure prior to combination with the uncured core material and then in a single cycle of final cure the complete assembly can be cured. Under such conditions since the skins are in a conformable B-stage cured condition, the assembly can be shaped in a die or mold positioned in the press to provide a desired shape for the final product. In this regard both surface layers 41 and 42 sandwiching the core can be made of sheet molding compound (SMC) layers in which the final cure is accomplished under heat and pressure. The sheet molding compound being an entrapped gel material will become solidified under heat and pressure when cured to provide the final surface layers.

As still another variation of the invention, an uncured prepreg layer on one side of the core and a sheet molding compound layer can be assembled on the other side of the core as the outer layers of the laminate either before or while the laminate cure is effected.

Figure 7A:
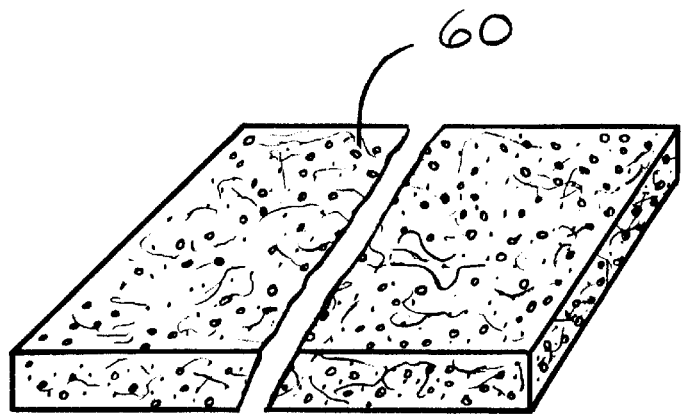
FIG. 7(A) is a broken away perspective view of syntactic core material of the present invention including reinforcing elements in the form of fiber bundles distributed through the resin-microsphere structure.
Figure 7B:
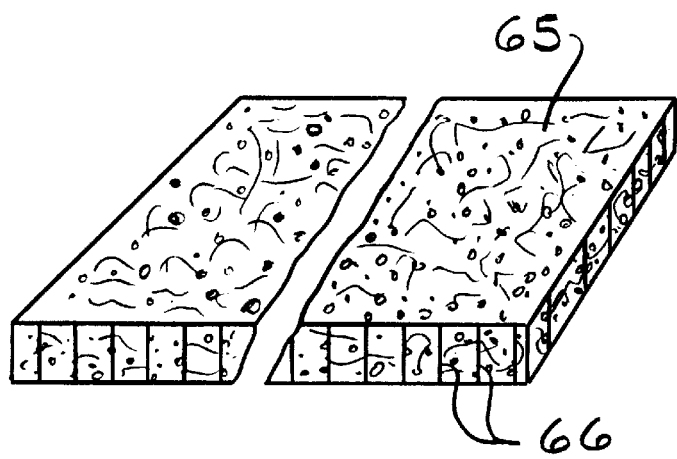
FIG. 7(B) is a broken away prospective view of a syntactic foam core layer of material of the present invention, including a layer of reinforcing material in the form of a honeycomb structure distributed through the foam structure.

FIG. 7 (A) illustrates another form of the invention in which the syntactic foam layer 60 includes additional reinforcing elements such as glass fibers or carbon fibers in individual form or as chopped strand bundles or in the for of continuous strand mats or stacked non-woven or woven fabrics. Such foam material can be made substantially as represented in FIG. 4.

FIG. 7 (B) illustrates the invention in which syntactic foam layer 65 includes a honeycomb structure 66 as reinforcement for the layer of syntactic foam, which increases both the compressive and shear strengths of the layer of material. The honeycomb structure 66 extends throughout the layer of material with the cellular structure perpendicular to the major surfaces of the layer. The syntactic foam material can be arranged to extend over both surfaces of the layer or extend just to the surfaces with the honeycomb structure visible at the surfaces. Still further, the combination can be arranged so that the syntactic foam material extends over only one surface with the base material of the honeycomb structure visible on the opposite side.

Figure 8:
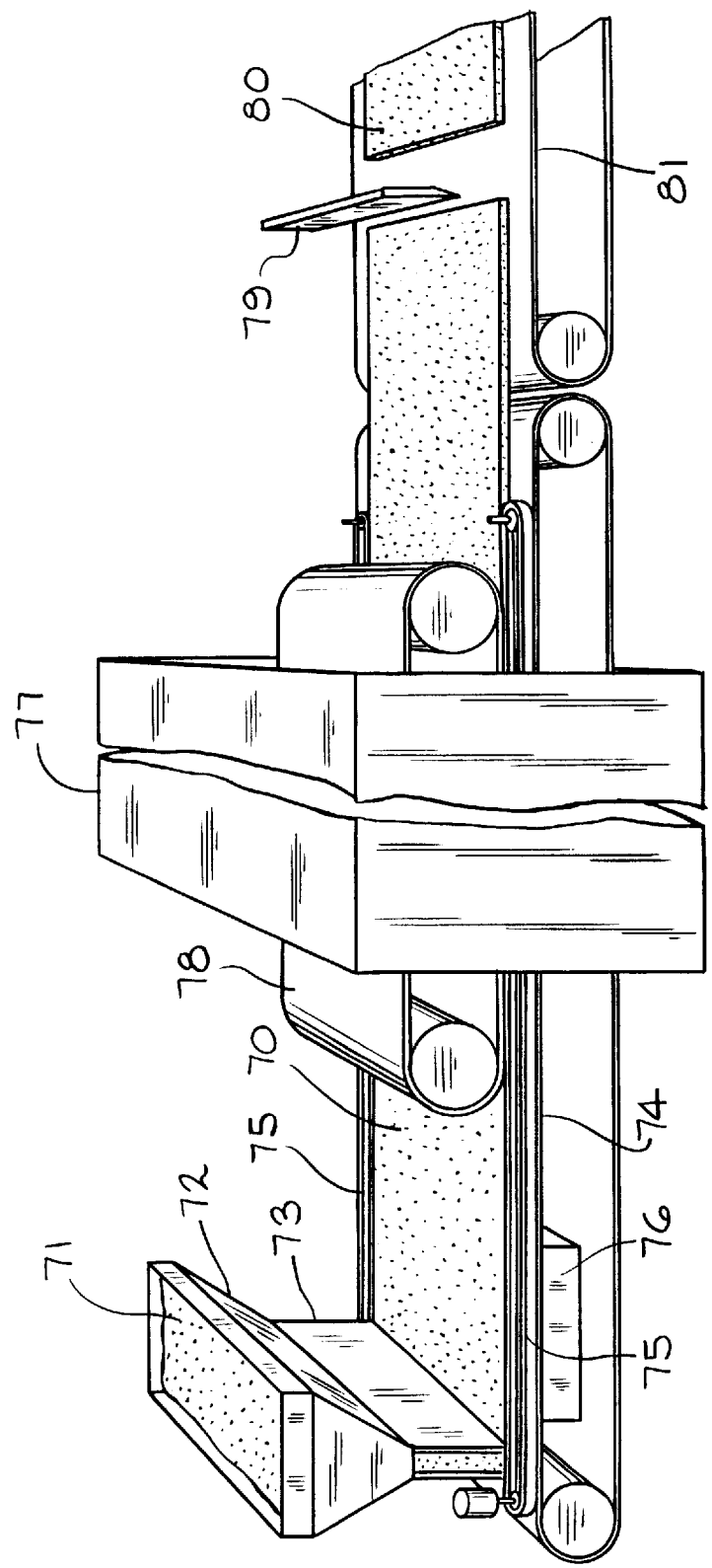
FIG. 8 is a schematic illustration of a portion of a continuous production line for producing a syntactic foam sheet according to the principles of the present invention.

FIG. 8 illustrates a continuous conveyor line process for Production of syntactic foam sheet material according to the invention in which glass microspheres and resin powder, and optionally reinforcing elements, are introduced into a hopper 72 to which the components are supplied in continuously metered form or in batch form in predetermined percentage amounts by weight or volume to produce a mixture 71. The mixture 71 is supplied from the hopper through an end spout 73 to a conveyor belt 74 over an underlying vibrator 76 by which the mixture is sufficiently agitated to effect uniform distribution of the resin, and any included reinforcing elements uniformly throughout the mass of microspheres. The vibrated mixture then is conveyed by the continuously moving conveyor belt 74 having associated moveable side walls 75 on opposite edges of the conveyor belt which move in unison therewith to limit the breadth of distribution of the mixture deposited on the conveyor. The side walls 75 might optionally be stationary side walls but are preferably arranged to move in unison with the conveyor as a raised edge confining the particulate mixture to the width of the belt.

The conveyor belt 74 is made of a high-temperature flexible material such as a high-temperature polymer material or can be a flexible metal belt such as a steel band. The conveyor with the uncured syntactic foam material deposited thereon is passed through a curing oven 77 having an overlying belt 78 arranged to mate with the conveyor belt 74 to compact the foam material 70 to the thickness determined by the height of the side walls 75 as well as to apply pressure to a degree called for to establish a desired density in the sheet material as it is being cured in the oven. The temperature and the rate of movement of the conveyor belt 74 through the oven are selected to provide the cure cycle matching the material 71 supplied from the hopper 72 by way of the channel 73. Both the conveyor belt 74 and the overlying belt 78 are surfaced with a separator material to avoid sticking or bonding of the foam material to the belts during the cure cycle.

As a continuous sheet of syntactic foam material moves from the oven 77 it is passed onto a secondary conveyor 81 where the length of the sheet is determined by cutting it with means such as a chopper 79. Alternatively, cutting means such as a saw, a laser, or a water jet cutter may be used to provide a syntactic foam sheet 80 meeting predetermined desired length specifications.

Microspheres of glass included to lighten the weight of the foam material, by way of example, can have a bulk density in the order of 0.2 pounds per cubic foot. The density of the solid resin in contrast would be about 80 pounds per cubic foot. When the microspheres and powder in addition to reinforcing elements are intermixed, a final product can be made in a density range of from 6 to 45 pounds per cubic foot. The sheet material can be made to any thickness such as in the range of from about $1/16$ inch to 6 inches or more.

A mixture including phenolic resin as the matrix binder and a catalyst therefor along with the microspheres and additional reinforcing elements can be cured at a temperature in the order of 325–350 degrees F. with the heating surface in contact with the mixture for a period in the order of approximately 10 minutes per inch of thickness. No post cure of the product has been found necessary. The resulting foam material is formed practically without volitization of any components. Little or no water or solvents are given off. That is, the process is a dry system rather than a liquid system.

During heat processing of the raw material, the resin powder during heating goes through a transition stage in which it is in a semi-sticky liquid stage which ultimately becomes solid in consolidated relation with the glass microspheres and reinforcing elements. The foam character of the material results from the voids provided by both the hollow microspheres and the voids left by reason of melting of the powdered resin which solidifies to a much lesser volume than the bulk powdered resin. By varying the ratio of the components it is found that a shear modulus of the resulting sheet can be provided generally in the range of 500 to 25,000 psi with a compression strength generally in the range of 100 to 4,000 psi.

For a layer of resin powder intermixed with microspheres having a thickness of about 1 inch conductively heated by contacting hot platens above and below without pressure applied to the layer, a syntactic foam product having a density of about 6 pounds can be formed in a cycle time in the range of 10–15 minutes. When the mixture is thicker than the surrounding spacer members in a press, the upper platen can be closed slowly to compact the mixture without rupturing the microspheres. By so following the changes in dimensions of a mixture of sufficient thickness as it is heated, it has been found that a foam layer having a density of about 9 lbs. per cubic foot can be produced. For a mixture layer of 2 inches thick the cure time is about 22 minutes. When the mixture is greater than 1–2 inches thick it can be effectively microwave heated. Following are other examples of syntactic foam cores of different densities which have been made according to the present invention:

|  | % Volume | % Weight |
| --- | --- | --- |
| 1. 9 lbs/cu ft foam |  |  |
| Phenolic resin powder | 2.38 | 20 |
| Glass bubbles | 97.62 | 80 |

-continued

|  | % Volume | % Weight |
|---|---|---|
| 2. 15 lbs/cu ft foam | | |
| Phenolic resin powdar | 4.27 | 22.20 |
| Glass bubbles | 95.73 | 77.80 |
| 3. 19 lbs/cu ft foam | | |
| Phenolic resin powder | 4.96 | 20.34 |
| Glass bubbles | 92.54 | 59.32 |
| ½" Chopped bundles of 17 micron glass fibers (1000 fibers per bundle) | 2.50 | 20.34 |
| 4. 22 lbs/cu ft foam | | |
| Phenolic resin powder | 13.51 | 50.0 |
| Glass bubbles | 86.49 | 50.0 |
| 5. 28 lbs/cu ft foam | | |
| Phenolic resin powder | 30.67 | 60.48 |
| Glass bubbles | 64.30 | 19.81 |
| Glass fiber mat 1.5 oz/sg ft | 5.04 | 19.71 |

The resin particle size in each of the above examples was in the order of 20 microns. A particle size of 50 microns is judged to be the upper desirable limit of the resin powder for satisfactory production of a foam according to the invention. The finer the resin powder the better the product properties that are attained, down to as low as one micron size particle. The glass bubbles in each of the examples above had a US 80 mesh particle size (177 microns).

A coupling agent, although not necessary on the microspheres, when present assists in wetting and adherence of the resin to the microsphere surfaces and by reason of its surface tension acts to interconnect the adjacent microspheres in the mass.

The resin powder can be a reactive resin such as is produced as a waste byproduct from powdered resin coating materials. In other words the small diameter dust powder collected as waste, in a powdered coating production facility and which is usually air borne and collected as waste during manufacture of the powdered coating has been found to be excellent in providing syntactic foam according to the present invention.

As another embodiment of the invention the resin powder can also include dry unexpanded resin particles expandable into microballoons upon application of heat. In such instances the mixture of core material, in addition to having the ceramic microspheres interbonded by ordinary resin powder particles, are bonded by resin particles expanded into resin microballoons or bubbles in spaces between microballoons upon supply of heat to originally unexpanded dry resin particles. Such unexpanded resin particles are commercially available under the trade name "Expancel" from Casco Products AB of Sundsvall, Sweden.

Figure 9:
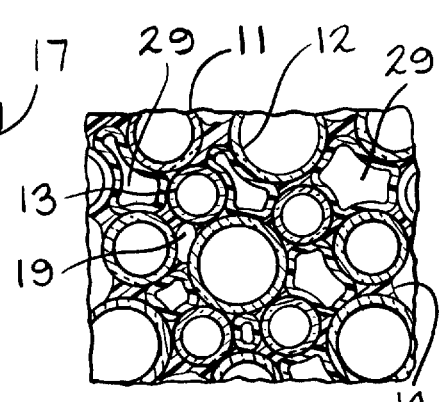
FIG. 9 is an illustration representative of a magnified broken away view of a portion of a product like that of FIG. 1 as taken on line 2—2 illustrating a mixture of hollow microspheres of different sizes and cured resin powder and resin powder expanded into microballoons in a rigid syntactic foam core material of the invention.

The unexpanded expandable resin particles are light weight bulk materials and when expanded in the mixture of ceramic microspheres and fine unexpandable resin powder assist the unexpandable powder in interbonding the ceramic microspheres to from the rigid core material of the invention. The expandable particles are raised in temperature within the ceramic microspheres with the ordinary bonding powder particles to a temperature level which produces a softening and binding adherence of the resin particles with the microspheres. As illustrated in FIG. 9, the expandable particles 29 expand to microballoon within spaces between the microspheres 11, 12 and 13 and the resin bonds 14 of the unexpandable particle in conformation with the shape of such spaces. The temperature is raised preferably to a level no higher than that above which the microballoons will burst. In the event bubbles of the particles of expandable resin do burst, however, the resulting distributed material of the microballoon walls are still effective in producing an interbonding relation between the ceramic microspheres. As indicated, maintaining the level of temperature of the mixture below the burst temperature of the expanded resin particles is preferred because of the greater strength of the integral microballoons as well as confinement of any gas which might otherwise be released by bursting of the expandable particles and the lesser moisture permeability of the cured core material.

The maximum temperature of the particle mixture at which bursting will not occur when a mixture of phenolic and 091–80 Expancel resin particles are included, is in the order of 350 degrees F. The expansion of such particles start at a temperature in the order of 250 degrees F. For other such Expancel particles, the start of expansion can occur at temperatures as low as 160 degrees F. The shape of the individual expandable resin particles if unrestrained to a final integral configuration is a microsphere. If, however, the expanding particles are confined within voids or spaces within the mass of ceramic microspheres and other resin matter, they act like balloons and expand in conformation with the space available. In such instances the interbonding of ceramic microspheres is found to be tighter or stronger and the shear modulus can accordingly be increased to a value in the order of 45,000. Test observations indicate that the density of the core material can be made to reach as low as or lower than 2 pounds per cubic foot.

Following are examples of material of different densities of the invention which have been made predominantly of glass microspheres having a bulk density of 2.33 lbs/cu ft. incorporating fine resin particles having a bulk density of 20.59 lbs/cu ft. and initially unexpanded dry particles of resin having a bulk density of 17.47 lbs/cu ft. expandable into bonding microballoons within the mass of microspheres.

|  | % Volume | % Weight |
|---|---|---|
| 1. 6 Lbs/Cu Ft Foam | | |
| Phenolic Resin Powder | 6.76 | 37 |
| Glass Microspheres | 91.99 | 57 |
| Expandable Resin Particles | 1.26 | 6 |
| 2. 9 Lbs/Cu Ft Foam | | |
| Phenolic Resin Powder | 8.59 | 43 |
| Glass Microspheres | 90.04 | 51 |
| Expandable Resin Particles | 1.37 | 6 |
| 3. 12 Lbs/Cu Ft Foam | | |
| Phenolic Resin Powder | 12.55 | 53 |
| Glass Microspheres | 85.82 | 41 |
| Expandable Resin Particles | 1.63 | 6 |
| 4. 15 Lbs/Cu Ft Foam | | |
| Phenolic Resin Powder | 16.33 | 60 |
| Glass Microsphsres | 81.79 | 34 |
| Expandable Resin Particles | 1.87 | 6 |
| 5. 18 Lbs/Cu Ft Foam | | |
| Phenolic Resin Powder | 20.61 | 66 |
| Glass Microspheres | 77.25 | 28 |
| Expandable Resin Particles | 2.15 | 6 |

-continued

|  | % Volume | % Weight |
|---|---|---|
| 6. 24 Lbs/Cu Ft Foam | | |
| Phenolic Resin Powder | 27.50 | 73 |
| Glass Microspheres | 69.91 | 21 |
| Expandable Resin Particles | 2.59 | 6 |

The resin particle size in each of these examples was in the order of 20 microns and the size of the microspheres was about 177 microns while the diameter of the unexpanded expandable particles was in the range of 18 to 24 microns. The unexpanded resin particles can have a diameter anywhere within the commercially available range of approximately 5 to 25 microns and 50 microns is judged to be the upper desirable limit.

The quantity of expandable particles by weight of the mixture of microspheres and expandable bonding resin is in the range of 2 to 20% with a nominal 6 to 7% being found capable of providing a wide range of the properties desired.

By addition of the expanded resin particles, the resulting foam core material is found in tests to have a reduced moisture absorption due to a much lower permeability in an order of about 10 to 1 reduction. By way of example, teats of an 18 pcf material yielded 6% absorption while a 12 pcf material yielded less than 2% absorption. The use of expandable resin particles has been found capable of increasing compressive strength 75%. The expandable particles also permit the skin layers of composite sandwich structures to withstand pressures in molding processes which require high flow and therefore high fluid pressure on the core. Mixing of resin and the microspheres to obtain the desired properties requires a minimum or no shear on the material during mixing which it has been found can be accomplished with a tumble mixer.

If the reinforcement material for the syntactic foam layer is provided in the form of carbon fiber or glass fiber mats or high strength glass fiber mats or hollow glass fiber mats to increase the flex strength of the composite, a mat of sufficient thickness can be provided so that the resin powder and microspheres can be deposited and sifted into the mat by agitation. Such a process can provide a foam which when cured has improved physical and mechanical properties compared to a three component foam sheet which includes chopped fibers only as reinforcing elements.

Any number of skin materials can be bonded or molded to the core go made, including composite resin sheets of different material or metal sheets such as aluminum sheets.

In forming a three dimensional article of the syntactic foam, a layer of the mixture of basic components, that is the bubbles, reinforcing media and powdered resin along with its catalyst if it is a thermosetting resin, can be pre-heated to a sticky integrated conformable stage which can then be draped over a three dimensional form for a final cure or hardening to the three dimensional article of desired shape. Microwave energy can be utilized for pre-heating and for cure of such a product, whether in planar or three dimensional form. The three dimensional shaping can result from use of a mold or tray having a contoured three dimensional shape in which the mold or tray is filled with a mixture of the powdered resin, reinforcing elements and glass microspheres which are pre-heated to a prepreg sticky condition and then further shaped into the three dimensional form.

As still another variation of the invention, the foam material can be cured into a thick block or a thick layer which can be machined or passed through a router for a desired three dimensional shape.

By way of example as illustration of the flexibility of properties obtainable for densities of unreinforced syntactic foam core layers in the range of 6 to 45 pounds per cubic foot, typical properties produced in samples tested according to ASTM standards fall within the following ranges: compressive strength (psi) 100 to over 4000; shear strength (psi) 74–1100; shear modulus (psi) 1500-over 24,000.

Ideally when a composite in the form of a sandwich structure is formed with two faces of high strength material on opposite sides of the syntactic foam core, the core is desirably engineered so that in actual use when stressed to the breaking point a non-preferential rupture will occur either in the core or a face of the composite. That is, it is desired ideally that the face sheet strength and the core strength be substantially equal against rupture in the stressed sandwich structure. By way of examples if a face material has a flexural modulus in the order of 5.2 million psi and the shear modulus of the core is in the order of 20,000 pounds per square inch, the rupture strength of the composite or flexural modulus has been determined in the order of 4.3 million psi.

In view of the foregoing it will be understood that many variations of the arrangement of the invention can be provided within the broad scope of principles embodied therein. Thus while particular preferred embodiments of the invention have been shown and described, it is intended by the appended claims to cover all such modifications which fall within the true spirit and scope of the invention.

We claim:

1. A syntactic foam core material adapted to providing a low density reinforced syntactic foam core for composite layered structures comprising a layer of hollow ceramic microspheres, dry resin powder particles of binder finer in dimension than the diameter of said microspheres thoroughly intermixed in said layer of microspheres to provide a uniform mixture of said powder particles and microspheres, said microspheres being a major percentage by volume of said mixture, said syntactic foam core material including a honeycomb structure extending through the body of said layer for reinforcement of said layer, said mixture of microspheres and resin powder particles having been processed through a cycle of heat softening and setting of said resin particles in interbonded relationship with said microspheres and honeycomb structure, said resin particles being present in a quantity to interbond said mixture and said honeycomb structure into an integrated rigid layer, said layer having opposite major surfaces for combination with layers of material on opposite sides thereof in layered composite structures.

2. A syntactic foam core material as set forth in claim 1 in which said microspheres are glass microspheres.

3. A syntactic foam core material as set forth in claim 1 in which said resin powder particles include unexpandable and expandable dry resin binder particles thoroughly intermixed in said mixture, said expandable resin binder particles being expandable into microballoons in binding relation with said microspheres and unexpandable powder particles upon heat processing of said resin powder particles.

4. A syntactic foam core material as set forth in claim 3 in which said expandable resin particles comprise 6 to 7% by weight of the particles in said mixture.

5. A syntactic foam core as set forth in claim 1 in which said microspheres are present in a percentage amount by volume of at least 60% of said mixture.

6. A syntactic foam core material as set forth in claim 5 in which the diameter of the microspheres is generally in the order of 170 microns and the size of both said powder particles and expandable resin particles is in the order of 20 microns.

7. A syntactic foam core material as set forth in claim 1 in which said honeycomb structure is formed of a base material of cellulose paper.

8. A syntactic foam core material as set forth in claim 1 in which said honeycomb structure is formed of one of a group of base materials consisting of fibers of glass, carbon, cellulose and aramid fibers treated with resin.

9. A syntactic foam core material set forth in claim 1 in which said honeycomb structure is formed of one of a group of metal base materials consisting of aluminum and copper.

10. A syntactic foam core material as set forth in claim 1 in which said resin particles include resin particles which are expandable into microballoons.

11. A syntactic foam core material as set forth in claim 1 in which said binder particles comprise 2 to 20% by weight of the particles in said mixture.

12. A method of producing a reinforced syntactic foam core material adaptable to incorporation in layered composite structures comprising forming a mass of dry particles by combining as parts of said mass a predominant amount by volume of ceramic microspheres and the remainder being dry particles of a first activatable resin binder, physically agitating said mass to thoroughly intermix said dry particles into a uniform mixture, depositing said uniform mixture as a layer in the cavity of a cavity mold, placing a honeycomb structure in said mold cavity over said mixture layer, closing said mold to press said honeycomb structure against said mixture layer;

heating said mixture to heat-soften said resin binder particles for penetration of said mixture into the cells of said structure and establishment of a bonding relation with said microspheres, and cooling said heated mixture to set said heat-softened resin particles and interbond said resin particles with said microspheres and honeycomb structure as a core layer.

13. A method of producing a syntactic foam core material as set forth in claim 12 in which a catalyst is added in said mass of particles to enhance the adhesion of said resin particles with said microspheres.

14. A method of producing a syntactic foam core material according to claim 13 in which said catalyst is coated on said microspheres.

15. A method of producing a syntactic foam core material as set forth in claim 12 wherein a second heat activatable resin expandable into microballoons is added as part of said particles of heat activatable resin binder.

16. A method of producing a honeycomb reinforced syntactic foam core layer adaptable to incorporation in layered composite structures comprising placing a honeycomb structure in the cavity of a cavity mold, depositing over said honeycomb structure a layer of dry particles of a syntactic foam mixture predominately of ceramic microspheres and the remainder of dry particles of a heat activatable resin binder, said layer including sufficient foam mixture to extend through the cells of said honeycomb structure, closing said mold, heating said mixture to heat-soften said resin binder particles for penetration of said mixture into the cells of said structure and establishment of a bonding relationship with said microspheres, and cooling said heated mixture to set said heat softened resin particles and interbond said resin particles with said microspheres and honeycomb structure as a core layer.

17. A method as set forth in claim 16 in which sufficient foam mixture is deposited in said mold cavity to form a layer over said structure in said core layer.

18. A method as set forth in claim 16 in which said dry particles of resin binder include resin binder particles expandable into microballoons.

19. A method as set forth in claim 16 in which sufficient syntactic foam mixture is deposited over said honeycomb structure which in addition to extending throughout said honeycomb cells will provide a layer of syntactic foam over said honeycomb structure.

20. A method as set forth in claim 19 in which a layer of syntactic foam mixture is deposited in said mold before placing said honeycomb structure thereover in said mold.

* * * * *